Patented Dec. 8, 1925.

1,565,125

UNITED STATES PATENT OFFICE.

LEONARD SCHADE van WESTRUM, OF NEW YORK, N. Y.

PROCESS OF PRODUCING A BINDING AND WATERPROOFING BITUMINOUS SOAP FOR BINDING AND WATERPROOFING PAVING AND BUILDING MATERIALS.

No Drawing.     Application filed January 19, 1925. Serial No. 3,494.

*To all whom it may concern:*

Be it known that I, LEONARD SCHADE VAN WESTRUM, a subject of the Queen of the Netherlands, residing at New York city, in the county and State of New York, have invented certain new and useful Improvements relating to a process of producing a binding and waterproofing bituminous soap for binding and waterproofing paving and building materials, of which the following is a specification.

The invention relates to the process of manufacturing and the applications of a bituminous binding material, which can be used cold for binding paving materials such as stones, sand, cinders, clinkers, wooden blocks, and also for binding and waterproofing building materials, such as bricks, stones, mixtures of these materials, concrete and the like.

Emulsions of bitumen, made from liquid and hard asphaltums and other ingredients, which depend for their action as binding agents upon their oxidation by the air, when mixed with cold stone or the like are liable to be washed away by rain in wet weather before the volatile agent has evaporated since the oxidation which forms an insoluble soap does not take place with sufficient rapidity.

It is well known, as described for example in my British Patent No. 6,823 of 1915, to emulsify bitumen by certain oils and alkalies which form an asphaltic emulsion, which, after mixing with the stone or other material, is rendered insoluble by the addition of lime, acids or the like. These methods are, however, liable to reduce the binding quality of the asphaltic or bituminous binder.

It is an object of this invention to produce a bituminous soap which will oxidize with greater rapidity than the soaps hitherto used.

For this purpose the oil mixed with the bitumen and the saponifier belongs to the class of drying oils, of which linseed oil is the type. The solidification which accompanies the oxidation by air of the drying oil soap may be accelerated by the addition of a resin, such as common rosin, copal resin or dammar resin.

The soap is formed by saponification by an alkali, such as caustic soda or potash, of the drying oil and any other saponifiable matter contained in the mixture of bituminous material, such as asphaltum, tar or other bituminous substance, which mixture may include a non-drying vegetable oil like rape-seed oil, which, if used, will also be saponified by the alkali.

The following example illustrates the invention:—

30–50 parts by weight of asphaltum are heated in a kettle, provided with a stirrer, until the temperature of the asphaltum is 90–100° C., 3–8 parts of common rosin and 3–8 parts of linseed oil are stirred in and 5–50 parts (according to the desired consistence of the finished soap) of caustic soda lye of 25 per cent strength and heated to the said temperature are added. The mixture is stirred until saponification is complete.

The cold soapy mixture is mixed, according to the use for which it is intended, with broken stones, cinders or other materials above mentioned. The rate at which the mixture oxidizes and hardens depends on atmospheric conditions and if found to be too rapid, producing too hard a binding material, the manufacture may be modified by adding to the materials to be saponified in accordance with the foregoing example, from 1 to 4 parts of rape-seed oil.

The mixture of bituminous soap and material to be bound is compressed in the usual maner by tampers, rollers or presses according to the use for which it is intended.

It will be noted that the glycerin produced by the saponification of the oil is not separated from the soap produced.

Having thus described the nature of my said invention and the best means I know of carrying the same into practical effect, I claim:—

1. A process of producing a binding and water-proofing bituminous soap for binding and water-proofing paving and building materials, which consists in mixing, while hot, 30-50 parts by weight of asphaltum, 3-8 parts of resin, 3-8 parts of linseed oil and 5-50 parts of caustic soda lye until saponification is complete.

2. A process of producing a binding and water-proofing bituminous soap for binding and water-proofing paving and building material, which consists in mixing, while hot, 30-50 parts by weight of asphaltum, 3-8 parts of resin, 3-8 parts of linseed oil, 1-4 parts of rape-seed oil, and 5-50 parts of caustic soda lye until saponification is complete.

In testimony whereof I have signed my name to this specification.

LEONARD SCHADE van WESTRUM.